United States Patent Office 3,420,772
Patented Jan. 7, 1969

3,420,772
REACTIVATING MOLECULAR SIEVES
John C. Eck, Convent, and William C. Zegel, Morristown, N.J., assignors to Allied Chemical Corporation, New York, N.Y., a corporation of New York
No Drawing. Filed June 21, 1965, Ser. No. 465,702
U.S. Cl. 208—310                                    3 Claims
Int. Cl. C10g 25/12; C10g 25/04

ABSTRACT OF THE DISCLOSURE

This specification discloses a method of regenerating molecular sieves which have been utilized for the alternate absorption and desorption of straight chain paraffins until the capacity for further absorption by the molecular sieve has been substantially depleted, by contacting the molecular sieve with water at a temperature of from 60–300° C. and then dehydrating the molecular sieve by heating at a temperature from about 200° to about 400° C. The molecular sieve treated as above has an absorption capacity equal to that of unused molecular sieve.

---

This invention relates to an improvement in the process of separating straight-chain paraffin hydrocarbons from mixtures thereof with other hydrocarbons by selectively absorbing said straight-chain paraffins with molecular sieves. More particularly, the invention relates to a method of periodically restoring the adsorption capacity of molecular sieves used in the above process.

It is known that certain natural synthetic zeolites have the properties of preferentially adsorbing certain types of hydrocarbons from mixtures of the same with other hydrocarbons, as for example, removing normal paraffinic hydrocarbons from mixtures of the same with isomeric branched-chain hydrocarbons, cyclic hydrocarbons, and so on. These zeolites are composed of crystal patterns such that they present structures having a large number of pores of exceptionally uniform size. Only molecules that are small enough to enter the pores can be separated by adsorption.

The pores in different known zeolites vary in diameter from about 3 Angstroms up to about 10 or more Angstroms, but for any one zeolite the pores are of substantially uniform size. Because of these properties of uniform small pore size and of selective adsorption for certain molecules in preference to others, such zeolites are known as molecular sieves.

Included among the naturally occurring zeolites that have molecular sieve properties are analcite and chabazite. Zeolites differ from each other in chemical composition but they may be generally characterized as alkali metal or alkaline earth metal alumino-silicates. Analcite has the empirical formula $NaAlSi_2O_6$, while that of chabazite is $CaAl_2Si_3O_{12} \cdot 6H_2O$. Certain synthetic zeolites also have molecular sieve properties. For example, the Barrer patent, U.S. 2,306,610, teaches the use of a molecular sieve having the formula $(CaNa_2)Al_2Ni_4O_{12} \cdot 2H_2O$. While Black in U.S. Patents 2,442,191 and 2,522,426 describes a synthetic molecular sieve having the formula $$4CaO \cdot Al_2O_3 \cdot 4SiO_2$$

a detailed discussion of molecular sieves can be found in articles by Breck and others, appearing in the Journal of the American Chemical Society, vol. 78, pp. 5963 et seq. (December 1956).

Straight-chain paraffin hydrocarbons are selectively adsorbed from mixtures thereof with other hydrocarbons by zeolitic molecular sieves having effective pore diameters of about 5 Angstroms. This selective adsorption is the basis for widely used procedures for separating normal paraffins from hydrocarbon mixtures such as kerosene and naphtha. In commercial operation, a cyclic process is employed involving an adsorption step followed by a desorption step and then a second adsorption step, and so on. Although excellent separation of normal paraffins from other hydrocarbons can be obtained by this procedure, one of the limiting factors is that the adsorption capacity of the molecular sieves decreases after a number of adsorption and desorption cycles. The loss of sieve capacity is considered to involve two factors, one of these being the decrease in the saturation capacity of the sieve and the other being that the rate of adsorption decreases so that less material is adsorbed during a given period at a specified feed rate.

To some extent the loss in adsorbent capacity is related to the adsorption and desorption procedures used. In carrying out the adsorption step, the hydrocarbon feed can be desorbed by purging with a hot stream of inert either in liquid or in vapor phase. The molecular sieves can be desorbed by purging wtih a hot stream of inert gas, by displacing the adsorbed hydrocarbon with a gaseous olefin such as propylene to 250–300° C., by driving off the hydrocarbon by subjecting the molecular sieves to a high temperature of 700° F. or more, or by replacing the adsorbed hydrocarbon with a vapor or liquid phase stream of a normal paraffin or olefin or a chloroderivative thereof having a different, e.g. substantially lower, number of carbon atoms, and preferably a substantially higher or lower vapor pressure in order to facilitate subsequent separation by distillation.

Whatever combination of the above feeds and desorbents, the sieves gradually lose adsorptive capacity, though not at the same rate. Methods heretofore employed for reactivating molecular sieves have relied upon heating the deactivated sieves to a temperature of 500–1,000° C. in an attempt to remove contaminants by vaporization, oxidation or decomposition. It has been constantly observed, however, that with such heat treatment there is a continuous reduction in the sieve activity obtained which is believed to result from conversion of a portion of the contaminants present into products which cannot be removed from the pores of the molecular sieves.

It is therefore an object of the present invention to provide an improved process for periodically restoring the adsorption capacity of molecular sieves employed in the separation of straight-chain hydrocarbons by selective adsorption.

Another object of this invention is to provide a procedure for reactivating molecular sieves which avoids the formation of products which cannot be displaced from the pores of the sieves.

Additional objects and advantages of the invention will be apparent from the following detailed description thereof.

In accordance with the present invention it has been discovered that when the adsorption step is carried out employing a liquid phase feed of mixed hydrocarbons and the desorption step is carried out employing a liquid phase desorbent, the factors leading to a loss of molecular sieve adsorptive capacity are such that high temperature treatment is unnecessary to reactivate the sieve. By operating in the liquid phase rather than in the vapor phase, the thermal reaction of the organic compounds present, as catalyzed to some extent by the molecular sieves, is reduced and the amount of contaminating products deposited on the sieves is kept at a minimum. As a result, many cycles can be run before a serious loss in molecular sieve adsorptive capacity and/or activity takes place, and an important factor in this loss of capacity is believed to be a change in the state of hydration of the sieve. It has been found that the capacity and/or activity of these sieves of substantially but only partially depleted adsorptive capacity can be restored by a treatment with $H_2O$, which not only removes contaminating products which are present, but adjusts the state of molecular sieve hydration to that at which the sieves exhibit maximum adsorptive capacity. The importance of adjusting the state of sieve hydration is indicated by the fact that treatment with $CH_2Cl_2$ removes essentially the same contaminants as $H_2O$ but does not significantly increase sieve activity.

In the procedure of the present invention, deactivated molecular sieves are treated with $H_2O$ until the molecular sieves have been hydrated to their highest state of hydration following which the sieves are dehydrated. The $H_2O$ fed into contact wth the molecular sieves can be in the form of either liquid or steam, with steam beng preferred. For reasons which are not fully understood, no substantial amount of hydrocarbon can be added along with the $H_2O$. Thus, if periodically druring the desorption step, steam or hot water is added to a hydrocarbon desorbent, upon subsequently dehydrating the sieves it is found that the activity of sieves has not been increased significantly. It is believed that the particular hydration of the sieve crystals required for reactivation cannot take place in the presence of any substantial quantity of hydrocarbon. If $H_2O$ alone is used as the treating agent, then any hydrocarbons present are removed by the $H_2O$ at the beginning of the treatment following which the desired hydration is accomplished.

The temperature of the $H_2O$ employed in the treatment of the sieves has an important effect on the sieve reactivation. The $H_2O$ should be at a temperature of 60–300° C., and preferably at about 90–200° C. The dehydration can be conveniently accomplished by heating at a temperature of 200–400° C., preferably while passing a stream of inert gas such as nitrogen through the molecular sieves.

In commercial operation it is most economical to conduct the hydrocarbon adsorption step for a relatively short, predetermined period of time. Thus, in determining molecular sieve activity, the adsorpton capacity of the sieves during a given period of time is measured rather than the total amount of material which can be adsorbed over an extended period of time. When the molecular sieves are dehydrated by means of a hot stream of inert gas such as nitrogen the pores of the molecular sieves become saturated with the inert gas and the amount of material subsequently adsorbed by the sieve can be conveniently determined by measuring the amount of nitrogen displaced.

In a typical operation, a hydrocarbon mixture such as kerosene or naptha containing straight-chain and other paraffins with 10–20 carbon atoms in the case of kerosene or 5–10 carbon atoms in the case of naptha, is fed through a bed of molecular sieves for a predetermined period, which is generally from about 2 to 30 minutes long. The hydrocarbon mixture is fed through the molecular sieves in liquid phase at an elevated temperature, generally in the range of 50–250° C., the system beng under sufficient pressure to maintain the hydrocarbon feed in liquid phase. Following this adsorption step, the selectively adsorbed straight-chain paraffin hydrocarbons are displaced by a desorbent, which is preferably a normal paraffin of up to 8 carbon atoms for kerosene, or kerosene or a fraction thereof for naptha. The desorbent is usually employed at a temperature of 50–250° C. under sufficient pressure to maintain a liquid phase. After the desorption step, more hydrocarbon mixture feed is placed into contact with the molecular sieves and the adsorption and desorption steps are repeated. Adsorption-desorption cycles are run until the adsorption capacity of the sieves has diminished considerably. The additon of hydrocarbons to the system is then stopped and $H_2O$ in either liquid or vapor phase is passed through the bed of molecular sieves at a temperature of about 60–300° C. for a sufficient length of time to hydrate the sieves to their highest state of hydration. The sieves are next dried by heating, preferably by means of a stream of inert gas at 200–400° C. After drying, the sieves are in a reactivated state and the adsorption-desorption cycles are resumed.

The following example is given to further illustrate the invention, but it is to be understood that the invention is not to be limited in any way by the details described therein.

EXAMPLE 1

The molecular sieves employed in this example were synthetic calcium alumino-silicate molecular sieves having pore diameters of about 5 Angstroms. One sample of molecular sieves tested was unused sieves while the remaining samples were taken from a batch of used sieves, the used sieves had been employed in a cyclic process for the separation of normal paraffins from kerosene until the adsorption capacity, as defined below, had declined to less than 13% of the original capacity. In the cyclic process, liquid kerosene was fed through the molecular sieves at a temperature of about 230° C. and a pressure of about 250 p.s.i.g., and desorption was carried out with n-heptane employing approximately the same temperature and pressure as used in the adsorption step. Adsorption capacity was measured by heating the sieves in a stream of nitrogen for two hours at 350° C., suspending the nitrogen-saturated sieves in isooctane at 0° C., adding n-hexane to the suspension, and measuring the quantity of nitrogen displaced from the sieves by the adsorption of the n-hexane during a 2.5-minute period.

The used sieves were divided into samples and subjected to a number of different treatments to effect reactivation. The tests included treatment with $H_2O$ at various temperatures, $CH_2Cl_2$ at 40° C. and butane-saturated steam at 110° C. The procedures used were as follows: (1) Runs 1 and 2 were untreated controls; (2) In Runs 3–5, the treating medium was continuously refluxed through the sieves in a Soxhlet apparatus; (3) In Runs 6–13, the sieves were preheated to the desired temperature and then a stream of the treating medium heated to the desired temperature was continuously passed through the sieves; (4) In Run 14, the sieves were placed in boiling water; and (5) Runs 15–21 were similar to Runs 6–13, except the sieves were not heated prior to the injection of treating medium. The water, $CH_2Cl_2$, and butane-$H_2O$ mixture were removed from the sieves during the subsequent step of heating in a stream of nitrogen. In the following table are given the medium with which each sieve sample was treated, the time and temperature employed, and the quantity of nitrogen displaced during the above-described adsorption capacity test.

REACTIVATION OF USED MOLECULAR SIEVES

| Run No. | Method of Reactivation (40 g. sieves) | Time (hrs.) | Temp. (° C.) | Reactivating Medium Used, ml./gm. | Cc. of $N_2$ Evolved (100 g. sieves), 2.5 min. |
|---|---|---|---|---|---|
| 1 | New Sieves | | | | 915 |
| 2 | Used Sieves | | | | 115 |
| | Used Sieves Treated With Refluxing: | | | | |
| 3 | $CH_2Cl_2$ | 8 | 40 | 9 | 192 |
| 4 | $H_2O$ | 18 | 100 | 9 | 1,072 |
| 5 | $H_2O$ | 6 | 100 | 9 | 1,021 |
| | Preheated Used Sieves Treated With: | | | | |
| 6 | Water | 1 | 20 | 70 | 349 |
| 7 | do | 1 | 65 | 70 | 932 |
| 8 | do | 1 | 93 | 70 | 913 |
| 9 | Steam | 1 | 127 | 70 | 977 |
| 10 | do | 1 | 150 | 70 | 1,075 |
| 11 | do | 20 | 150 | 1,400 | 1,080 |
| 12 | do | 2 | 205 | 31 | 306 |
| 13 | Butane Saturated with Steam. | 1 | 110 | 70 | 27 |
| 14 | Used Sieves in Boiling Water. | 8 | 100 | 7.5 | 999 |
| | Used Sieves Treated With: | | | | |
| 15 | Water | 1 | 16 | 100 | 349 |
| 16 | do | 1 | 66 | 100 | 931 |
| 17 | do | 1 | 93 | 100 | 913 |
| 18 | Steam | 1 | 158 | 20 | 814 |
| 19 | do | 1 | 205 | 15 | 817 |
| 20 | do | 1 | 248 | 20 | 769 |
| 21 | do | 1 | 248 | 100 | 762 |

The results shown in the above table indicate that: (1) Molecular sieves can be fully reactivated by the procedure of this invention; (2) Molecular sieves cannot be significantly reactivated by either treatment with a solvent such as $CH_2Cl_2$ or with a hydrocarbon-water mixture; and (3) When treating with steam at a temperature of over 200° C., it is best not to preheat the sieves to the treating temperature in the absence of $H_2O$.

It will be apparent that many modifications and variations may be effected without departing from the scope of the novel concepts of the present invention, and the illustrative details disclosed are not to be construed as imposing undue limitations on the invention.

We claim:

1. In a process for removal of straight-chain paraffin hydrocarbons containing between 10 and 20 carbon atoms from mixtures thereof with other hydrocarbons by contacting said mixture with a zeolite molecular sieve adsorbent to selectively adsorb said straight-chain paraffins and subsequently desorbing said straight-chain paraffins by contacting said zeolitic molecular sieve adsorbent with a desorbing material selected from the group consisting of molecular paraffins of up to 8 carbon atoms, wherein both said hydrocarbon mixture and desorbing material are in liquid form when brought into contact with said zeolitic molecular sieve, the adsorption and desorption of said straight-chain paraffins being cyclically repeated until the adsorptive capacity of the molecular sieve is substantially but only partially depleted, the improvement which comprises periodically restoring the adsorptive capacity of said molecular sieve adsorbent of only partially depleted capacity, by passing a reactivating material consisting essentially of water through said molecular sieve adsorbent at a temperature of 60° C. to 300° C. to thereby increase the state of hydration of said molecular sieve adsorbent to its highest state and subsequently drying said molecular sieve absorbent at a temperature of about 200° C. to 400° C.

2. A process as claimed in claim 1 wherein said zeolitic molecular sieves contain pores having a diameter of about 5 Angstroms.

3. A process as claimed in claim 1 wherein said $H_2O$ is passed through the molecular sieves in the form of steam at a temperature of 90° C. to 200° C.

References Cited

UNITED STATES PATENTS

| | | | |
|---|---|---|---|
| 2,818,449 | 12/1957 | Christensen et al. | 208—310 |
| 2,886,508 | 5/1959 | Hess et al. | 260—676 |
| 3,075,023 | 1/1963 | Garrison et al. | 252—420 |

DELBERT E. GANTZ, *Primary Examiner.*

HERBERT LEVINE, *Assistant Examiner.*

U.S. Cl. X.R.

260—676; 252—420